United States Patent [19]

Earley

[11] 4,030,225

[45] June 31, 1977

[54] DETACHABLE CONNECTOR FOR SECURING A MEMBER TO A FISHING LURE

[76] Inventor: Kenneth W. Earley, Rte. 6, Box 839, Bessemer, Ala. 35020

[22] Filed: Aug. 13, 1976

[21] Appl. No.: 714,020

[52] U.S. Cl. .............................. 43/42.09; 43/42.49; 43/44.83

[51] Int. Cl.² ...................................... A01K 91/04

[58] Field of Search ........... 43/44.83, 44.86, 42.49, 43/43.12, 42.09, 42.44

[56] References Cited

UNITED STATES PATENTS

| | | | |
|---|---|---|---|
| 2,902,304 | 9/1959 | Smith | 43/44.83 |
| 2,940,208 | 6/1960 | Oswald | 43/42.09 |
| 3,009,279 | 11/1961 | Jacobson | 43/42.09 |
| 3,091,885 | 6/1963 | Ulsh | 43/44.83 |
| 3,357,124 | 12/1967 | Stepacoff et al. | 43/42.09 |
| 3,518,784 | 7/1970 | Kling et al. | 43/44.83 |

Primary Examiner—Warner H. Camp
Attorney, Agent, or Firm—Woodford R. Thompson, Jr.

[57] ABSTRACT

A detachable connector for attaching one end of an elongated member to the body of a fishing lure having an inwardly extending bore therein. The outer end of the bore terminates in a shoulder spaced from the adjacent surface of the body which has an elongated slot therein in communication with the bore. The inner end of the elongated member carries a lateral projection disposed to pass through said slot and into the bore while the projection is in a first position and to engage the shoulder upon rotation of the elongated member and the projection to a second position in the bore. A yoke member within the bore has a transverse member connected to spaced apart legs which engage the shoulder at opposite sides of the projection upon movement of the projection to said first position and enter said slot at opposite sides of the elongated member upon movement of the projection to said second position. The yoke member is spring urged outwardly whereby its legs are moved into said slot upon movement of the projection to said second position.

7 Claims, 7 Drawing Figures

U.S. Patent     June 21, 1977     4,030,225

DETACHABLE CONNECTOR FOR SECURING A MEMBER TO A FISHING LURE

BACKGROUND OF THE INVENTION

This invention relates to a detachable connector for attaching one end of an elongated member, such as a fish hook or a fishing line, to the body of a fishing lure or the like.

Heretofore in the art to which my invention relates, many devices have been proposed for detachably connecting fish hooks and the like to a lure-like member. However, such devices are complicated in structure and are difficult to assemble, especially while one is fishing. Prior art means for detachably connecting fish hooks to a lure are shown in U.S. Pat. Nos. 1,457,550, dated June 5, 1923; No. 2,611,209, dated Sept. 23, 1952; No. 2,821,045, dated Jan. 28, 1958; and, No. 2,869,278, dated Jan. 20, 1959.

SUMMARY OF THE INVENTION

In accordance with my invention, I provide a detachable connector which facilitates attaching one end of an elongated member, such as a fishing hook or a fishing line connector element to the body of a fishing lure or the like. An inwardly extending bore is provided in the body of the lure with the outer end of the bore terminating in a shoulder which is spaced from an adjacent surface of the body which has an elongated slot therein in communication with the bore. A lateral projection is provided at the inner end of the elongated member which passes through the elongated slot and into the bore while the projection is in a first position. Upon rotation of the projection to a second position, it engages the shoulder to prevent outward movement thereof. A yoke is mounted within the bore and is provided with a transverse member connected to spaced-apart legs which engage the shoulder at opposite sides of the projection while the projection is in said first position and enters said slot at opposite sides of the elongated member upon movement of the projection to the second position. The yoke is urged outwardly so that the legs are moved into the slot upon movement of the projection to the second position.

DESCRIPTION OF THE DRAWING

A detachable connector embodying features of my invention is illustrated in the accompanying drawing, forming a part of this application, in which.

Detailed Description

Figure 5:
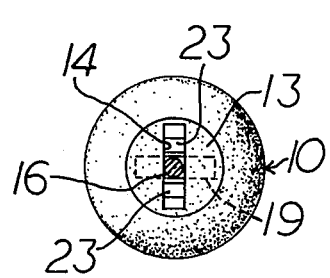
FIG. 5 is a sectional view taken generally along the line 5—5 of FIG. 4.

Referring now to the drawing for a better understanding of my invention, I show a lure body 10 having a centrally disposed bore 11 therein which terminates in a shoulder 12 which is inwardly of and in spaced relation to the adjacent end 13 of the lure body 10. As shown in FIG. 5, an elongated slot 14 is provided in the lure body 10 adjacent the end 13 thereof with the elongated opening 14 communicating with the bore 11, as shown.

Figure 1:
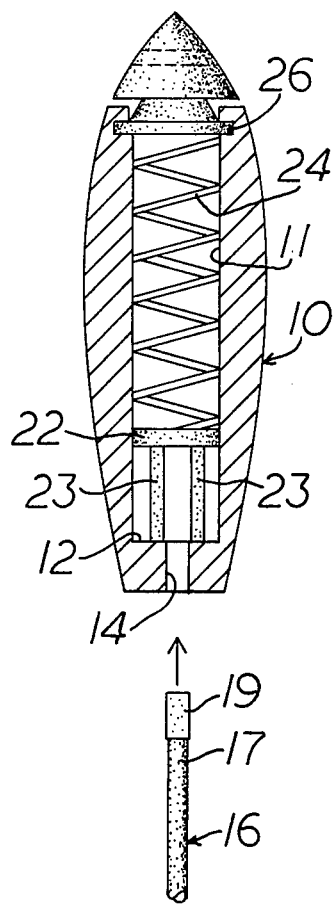
FIG. 1 is a sectional view showing the elongated member in the form of a hook just prior to insertion of the hook into the lure.
Figure 2:
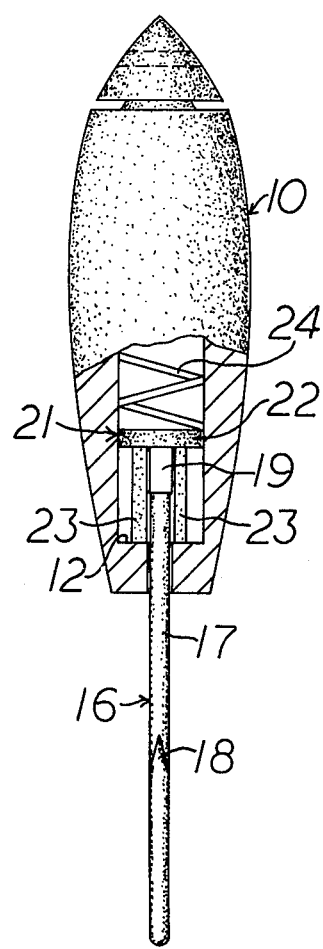
FIG. 2 is an elevational view, partly broken away and in section, showing the shank end of the hook inserted into the lure.
Figure 3:
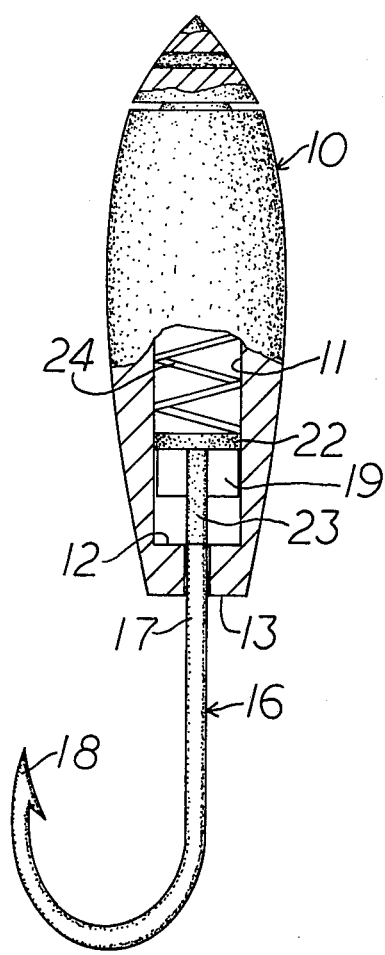
FIG. 3 is an elevational view, partly broken away and in section, showing the shank end of the hook and its lateral projection rotated 90° from the position showing in FIG. 2 and prior to movement of the lateral projection into locking position.

As shown in FIG. 2 and 3, the elongated member attached to the lure body 10 may be a fish hook 16 having an elongated shank portion 17 at one end and the usual hook 18 at the other end thereof. Secured to and extending laterally of the upper end of the shank portion 17 of the hook 16 is a lateral projection 19 which is of a size and shape to pass freely through the elongated slot 14 from the position shown in FIG. 1 to the position shown in FIG. 2. Upon rotation of the hook 16 and the lateral projection 19 carried thereby approximately 90° from the position shown in FIG. 2 to the position shown in FIG. 3, the lateral projection 19 extends above the shoulder 12 provided at the outer end of the bore 11.

Mounted within the bore 11 is a yoke-like member 21 having a transverse, disk-like member 22 which is connected to spaced-apart outwardly extending legs 23 which extend generally parallel to each other and are in position to engage the shoulder 12 at opposite sides of the slot 14 and at opposite sides of the lateral projection 19 upon movement of the lateral projection 19 to the first position shown in FIGS. 1 and 2. Upon movement of the elongated member, such as hook 16, approximately 90° to a second position shown in FIGS. 3 and 4, the outwardly extending legs 23 are in position to enter the slot 14 at opposite sides of the elongated member.

Mounted within the bore 11 of the lure body 10 is a compression spring 24 having one end thereof in contact with the disk 22. The other end of spring 24 engages a suitable spring abutment 26 which is carried by the opposite end of the lure body 10, as shown. The compression spring 24 urges the yoke-like member 21 outwardly so that the legs 23 are moved into the slot 14 at opposite sides of the elongated member or hook 16 upon movement of the lateral projection 19 to the second position shown in FIGS. 3 and 4.

Figure 7:
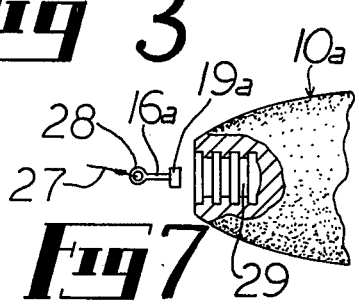
Figure 6:
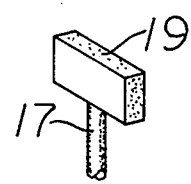
FIG 6 is a fragmental view showing the laterally projecting member carried by the shank of the fishing lure; and, FIG. 7 is a fragmental view, partly broken away, showing a modified form of my invention wherein the body of the lure is attached to a fishing line by an elongated connector element.

In FIG. 7 of the drawing I show a modified form of my invention in which the elongated member, indicated at 16$^a$ is in the form of a connector element which is adapted to connect a lure body 10$^a$ to a fishing line 27. One end of the elongated member 16$^a$ carries a lateral projection 19$^a$ which identical to the lateral projection 19 shown in FIGS. 1–6. The other end of the elongated member 16$^a$ carries an eye 28 which receives the fishing line 27. The lure body 10$^a$ is shown as carrying an insert 29 which is provided with an inwardly extending bore 11, as described hereinabove, for receiving the lateral projection 19$^a$. Accordingly, the lateral projection 19$^a$ is detachably connected to the insert 29 having the inwardly extending bore therein in a manner identical to the manner in which the fish hook 16 is attached to the lure body 10.

While I have shown the elongated member 16 and 16$^a$ as being connected to lure bodies and inserts which are mounted within lure bodies, it will be understood that the expression "lure body" is intended to include any member to which the fish hook or the fish line may be attached. For example, the lure body carrying the inwardly extending bore 11 which receives the laterally extending projection may be in the form of a weight.

Figure 4:
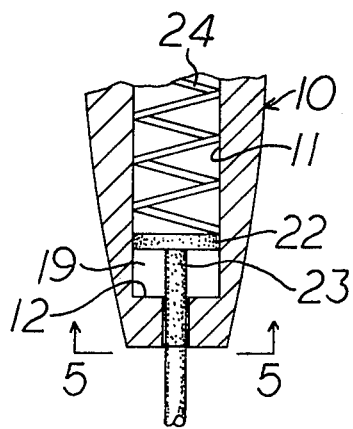
FIG. 4 is a fragmental, sectional view showing the lateral projection carried by the hook moved downwardly by spring means to the locked position.

From the foregoing, it will be seen that I have devised an improved detachable connector for attaching one end of an elongated member to a fishing lure body or the like. The elongated member may be attached to the lure body 10 or 10$^a$ by merely inserting the elongated member carrying laterally extending projection into the elongated slot 14 whereby it moves from the position shown in FIG. 1 to the position shown in FIG. 2. Upon rotation of the elongated member 16 approximately 90° from the position shown in FIG. 2 to the position shown in FIG. 3, the lateral projection 19 moves to a position above the shoulder 12 whereby upon release of the elongated member 16, the compression spring 24 urges the laterally extending projection 19 into engagement with the shoulder 12, as shown in FIG. 4. At the same time, the outwardly extending legs 23 move inwardly of the elongated slot 14 at opposite sides of the elongated member 16 whereby it is anchored firmly in place.

While I have shown my invention in two forms, it will be obvious to those skilled in the art that it is not so limited, but is susceptible of various other changes and modifications without departing from the spirit thereof.

What I claim is:

1. In a detachable connector for attaching one end of an elongated member to a fishing lure body comprising,
   a. an inwardly extending bore in said body with the outer end of said bore terminating in a shoulder in spaced relation to an adjacent surface of said body,
   b. an elongated slot in said adjacent surface of said body communicating with said bore,
   c. at least one lateral projection carried by an end of said elongated member and being of a size and shape to pass through said slot into said bore while said projection is in a first position in alignment with said slot and to engage said shoulder upon rotation of said elongated member and said projection carried thereby to a second position after moving said projection into said bore,
   d. a yoke-like member within said bore having a transverse member connected to spaced apart outwardly extending legs disposed to engage said shoulder at opposite sides of said slot and at opposite sides of said projection upon movement of said projection to said first position within said bore and disposed to enter said slot at opposite sides of said elongated member upon movement of said projection to said second position within said bore, and
   e. means to urge said yoke-like member outwardly so that said legs are moved into said slot at opposite sides of said elongated member upon movement of said projection to said second position.

2. A detachable connector as defined in claim 1 in which said elongated member is the shank of a fishing hook.

3. A detachable connector as defined in claim 1 in which said elongated member is provided with an eye in the end thereof opposite said end carrying said lateral projection of attaching said elongated member to a fishing line.

4. A detachable connector as defined in claim 1 in which a lateral projection extends laterally from opposite sides of said one of said elongated member.

5. A detachable connector as defined in claim 1 in which said inwardly extending bore is cylindrical.

6. A detachable connector as defined in claim 1 in which said transverse member of said yoke-like member is a disk with said spaced apart legs being secured to outer portions of said disk.

7. A detachable connector as defined in claim 1 in which said means to urge said yoke-like member outwardly comprises a spring member mounted between said yoke-like member and the inner end of said bore.

* * * * *